Figure 1:
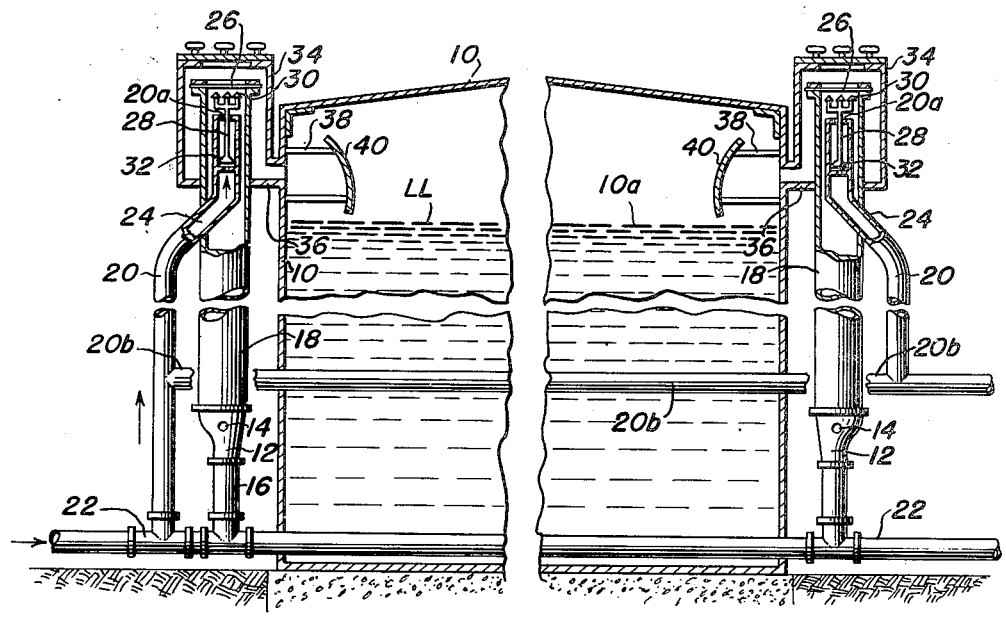

July 15, 1952     C. C. WATSON     2,603,298

FIRE FIGHTING APPARATUS

Filed Sept. 12, 1945

INVENTOR
CLAUDE C. WATSON
By
ATTORNEY

> # UNITED STATES PATENT OFFICE 2,603,298

FIRE FIGHTING APPARATUS

Claude C. Watson, Elizabeth, N. J.; Earl E. Watson, administrator of said Claude C. Watson, deceased, assignor to Standard Oil Development Company, a corporation of Delaware Application September 12, 1945, Serial No. 615,860

10 Claims. (Cl. 169—4)

This invention relates to fire fighting apparatus, and especially to apparatus for delivering air foam to tanks containing inflammable liquids.

The prevention and extinction of fires in tanks containing inflammable liquids is commonly effected by blanketing the surface of the liquid with foam. The introduction of such foam into tanks sealed from the atmosphere to prevent escape of fumes necessitates means for maintaining the seal while permitting delivery of the foam to the tank. The method of placing over the discharge end of the foam chamber a diaphragm easily destroyed by heat in case of fire does not permit the release of the foam as a protective blanket over the contents of a tank which is merely in danger of becoming involved in a fire due to a nearby conflagration. Similarly, the use of easily rupturable diaphragms designed to be broken by pressure of the foam when the foam-producing mechanism is started is unsatisfactory because of the low pressure involved and the rupture necessarily occurs in the weakest diaphragm of a series. In such cases, unsatisfactory functioning of the foam mechanism results because of the faulty distribution. The design of the apparatus of the present invention permits the delivery of foam to sealed tanks without such disadvantages of the prior art devices. Also, in the case of air foam makers in which the foam lines to tanks do not discharge at sufficient pressure to rupture the diaphragm in the tank connection, the invention relates to an arrangement for rupturing said diaphragm.

The invention is particularly concerned with the employment of the water main pressure to break a diaphragm which closes the conduit between the tank and the foam unit. Thus by having a small water pipe (in the end of which a plunger is installed), in parallel with the pipe which conducts water to the foam unit, water can simultaneously flow to the plunger and to the foam unit. From the foam unit foam will flow toward the tank and at the same time the plunger will break the diaphragm thereby permitting the foam to enter the tank. The rupture of all the diaphragms in a series of conduits can be made to occur at the same time if the water by-pass line is constructed as a header for piping to a series of diaphragm-sealing connections between the foam maker and the tank. This method of rupture of a series of diaphragms is particularly significant when a blanketing effect over the surface of the liquid contents of a tank is desired.

As a further improvement, one end of the diaphragm rupturing plunger may be formed as a valve to shut off the flow of water from the by-pass pipe into the foam conduit. Thus, by specially designing a diaphragm rupturing means and the end of the by-pass line in the foam conduit, the water pressure can be made to hold the rupturing means so as to prevent the entrance of further quantities of water from the by-pass line into the foam conduit after the rupture has occurred. In order that the pressure of the main water supply will cause breakage of the diaphragm, it may be made of any of a variety of easily rupturable materials such as cellophane, thin or scored glass or thin laminated metal. If scored glass or similar material is used in the diaphragm, the impact of a plunger element against the glass has been found sufficient to cause breakage.

Figure 2:
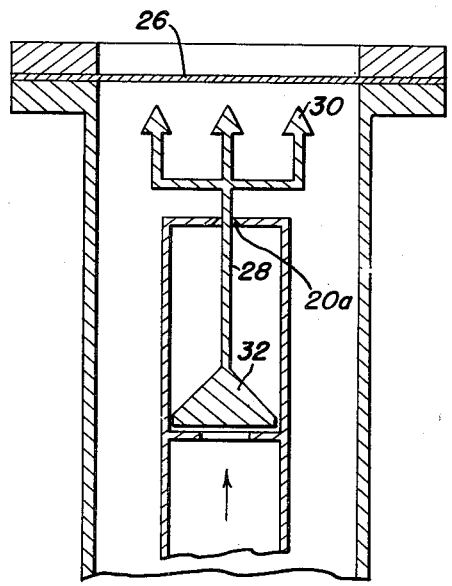

In order that the invention may be more fully understood, the following specific illustration is presented: Figure 1 is a side elevational view, partly broken away in central vertical cross-section, of the foam-producing and delivery apparatus as applied to the side wall of a tank containing an inflammable liquid; and Figure 2 presents detail of the diaphragm-rupturing means shown in Figure 1.

Referring to Figure 1, the side wall of the tank 10 with liquid 10a level content of an inflammable liquid is shown. The foam-producing unit 12 shown in this illustration prepares air foam by the suction of air through holes 14 into water containing a foam stabilizer passing into the unit through line 16. The upper part of the foam producing unit 12 extends into the foam discharge conduit 18. A pipe 20 by-passes the foam-producing unit from a T connection 22 on a portion of line 16 below the unit 12 and enters the discharge pipe 18 at 24. From location 24 in the discharge pipe, by-pass line 20 extends coaxially into the upper portion of the discharge conduit 18. The upper end of the discharge conduit 18 above the upper end of the line 20 is closed by an easily rupturable membrane 26. In this case, the membrane 26 is made of cellophane. Below the membrane 26 is a plunger 28, the stem portion of which passes through the constricted opening 20a of the upper end of the by-pass line 20. The upper end of the plunger 28 is sharpened, or, as specifically shown, has pronged elements 30. The lower end of the plunger has an upwardly directed, partly cylindrical and partly conical shaped section 32. The lower cylindrical portion of the plunger is in sliding relationship with the inside of the pipe 20. The inner sides of the constricted opening 20a of the by-pass line 20 allows for the free movement of the stem of the plunger in a vertical direction. The opening 20a is shaped to the conical surfaces of the plunger end 32 so that it will close the said opening when the plunger is pressed upwards against the upper end of the pipe thereby cooperating to function as a valve.

The uppermost portion of the discharge conduit 18 is encased within a chamber 34 which forms a continuation of the said conduit and which has connection in its lower portion with the inside of the tank 10 through the opening 36. On the sides of the tank, around the opening 36, are supports 38 for the baffle plate 40.

The device of the invention functions by the impingement of the pronged elements 30 of the plunger 28 against the easily rupturable diaphragm 26. The movement upward of the plunger is caused by the pressure of water on the lower end 32 of the plunger. Once the diaphragm 26 is ruptured, the foam produced in the unit 12 passes upwards through conduit 18, overflows at the upper end of the pipe and into the chamber 34, and then into the tank by means of the opening 36. The foam is deflected downwards as a result of the baffle element 40.

Although described with reference to a single installation, as illustrated in Figure 1, a series of installations may be arranged for interconnection as a system. In such a system, a number of foam chambers 34 may be provided to receive fire foam, as from generators or foam-producing units 12, and to discharge the foam at several separated points in a single tank, or in a number of separate tanks. In such a system, the bypass line 20 may be branched or manifolded as through a header 20b so as to connect with a series of foam discharge conduits 18 and provide for substantially simultaneous rupture of diaphragm seal members 26 in each of such conduits. In such a series arrangement, the several elements of the apparatus as disclosed will be of the same or similar nature and these elements are indicated in Figure 1 by the same numerical designations.

What is claimed is:

1. Apparatus for delivering fire foam comprising a foam chamber having a foam discharge opening, a foam generator, a conduit opening at one end from said generator and at the other end into said chamber, a frangible seal in said conduit normally sealing said conduit from the chamber, pipe means for supplying a foam-making liquid to the generator under pressure, a bypass line from said pipe means extending into said conduit, having a discharge end terminating within said conduit in spaced, substantially opposed relation to said seal, and plunger means in said discharge end ejectable therefrom against the seal, under pressure of a foam-forming liquid admitted through said pipe means and bypass line, to rupture said conduit seal.

2. Apparatus according to claim 1, in which said frangible seal is a frangible diaphragm disposed transversely of said conduit, normally sealing said conduit from said chamber.

3. Apparatus according to claim 2, in which the frangible diaphragm is a cellophane diaphragm.

4. Apparatus according to claim 2, in which the frangible diaphragm is a scored glass diaphragm.

5. Apparatus according to claim 2, in which the frangible diaphragm is a thin, laminated metal diaphragm.

6. In a system for delivering fire foam, a plurality of foam chambers, each having a discharge opening, generator means for producing fire foam and conduit means, for delivering said fire foam, opening into said chambers from said generator means, frangible seal means in said conduit means sealing said means from the chambers, pipe means for supplying a foam-making liquid to the generator means under pressure, bypass means from said pipe means extending into said conduit means, terminating within said conduit means in spaced, substantially opposed relation to said seal means, and plunger means carried in said bypass means, disposed therein for ejection therefrom against said seal means under pressure of a foam-forming liquid admitted through said pipe and bypass means, to rupture said conduit seal means.

7. In an apparatus for delivering fire foam, including a foam chamber having a discharge opening, a foam generator having a discharge conduit opening therefrom into said chamber, a frangible seal in said conduit between said generator and chamber, pipe means for supplying a foam-forming liquid to said generator, a means for rupturing said seal, comprising a bypass line from said pipe means extending into said generator discharge conduit, said line having a discharge end terminating within said conduit in spaced, substantially opposed relation to said seal, an annular partition in said end and an annular closure element having a central passageway forming a valve seat facing inwardly into said line, a valve element normally supported on said annular partition slidably engaging the inner surface of said line, a plunger element carried by said valve extending outwardly therefrom through said closure element passageway, in slidable relation thereto, into spaced relation to seal seal, said valve and plunger movable into engagement with said valve seat and seal respectively under pressure of a foam-forming liquid admitted to said line from said pipe means, to seat said valve and to rupture said frangible seal for the conduit.

8. Apparatus for supplying fire extinguishing fluid to the interior of a tank for holding inflammable liquids, which comprises a conduit communicating with the interior of said tank, a single diaphragm extending across said conduit to seal the entire passage in the conduit and prevent the escape of vapors from the tank under normal conditions, cutting means supported for movement against the diaphragm, and means for causing the impact of a jet of foam producing liquid to actuate said cutting means and thereby rupture said diaphragm.

9. Apparatus for delivering fire extinguishing foam to a tank which comprises a foam generator, a conduit leading from said generator to the interior or said tank, a frangible seal in said conduit constituting the sole means for preventing escape of vapors from the tank through said conduit, a striking device mounted for movement against the seal to break it, and means for causing foam liquid to force said striking device against said seal.

10. Apparatus for delivering fire extinguishing foam to the interior of a tank which comprises a conduit communicating with the interior of said tank, a frangible seal extending across the conduit to prevent escape of vapors from the tank through the conduit, a striker in the conduit supported to be moved against the seal, and means actuated by the foam liquid for moving said striker against the seal with sufficient force to break it.

CLAUDE C. WATSON.

REFERENCES CITED

The following references are of record in the file of this patent:

UNITED STATES PATENTS

| Number | Name | Date |
|---|---|---|
| 1,746,844 | Reddemann | Feb. 11, 1930 |
| 1,754,005 | Witter | Apr. 8, 1930 |
| 1,774,165 | Black | Aug. 26, 1930 |
| 1,844,056 | Bronander | Feb. 9, 1932 |
| 1,847,628 | Salmond | Mar. 1, 1932 |
| 1,917,694 | Boyd | July 11, 1933 |